United States Patent [19]

Mercier

[11] 4,206,908
[45] Jun. 10, 1980

[54] VARIABLE VOLUME HYDROPNEUMATIC ACCUMULATOR

[75] Inventor: Jacques H. Mercier, Paris, France
[73] Assignee: The Normand Trust, New York, N.Y.
[21] Appl. No.: 963,904
[22] Filed: Nov. 24, 1978
[30] Foreign Application Priority Data
  Feb. 9, 1978 [FR] France ................. 78 03623
[51] Int. Cl.² .................................. F16F 9/08
[52] U.S. Cl. ........................ 267/8 R; 138/30; 188/298
[58] Field of Search ................. 138/30, 31, 26; 188/298, 314; 267/8 R, 35

[56] References Cited
U.S. PATENT DOCUMENTS

| | | | |
|---|---|---|---|
| 3,445,103 | 5/1969 | Hennells | 188/314 |
| 3,692,368 | 9/1972 | Alexander | 138/31 |
| 4,132,395 | 1/1979 | Fox | 188/314 |

*Primary Examiner*—Lenard A. Footland
*Attorney, Agent, or Firm*—Arthur B. Colvin

[57] ABSTRACT

The present invention is directed to a hydropneumatic accumulator comprising a pressure vessel or casing having a cylindrical bore, a cylindrical container closed at both ends slidably mounted within said bore, the container having restricted flow passages communicating the bore of the casing to the interior of the container, and an expansible bladder member disposed within the container adapted to separate the container into two chambers communicating, respectively, with the bore of the casing and a gas input orifice in the end of the container external of the casing.

6 Claims, 4 Drawing Figures

VARIABLE VOLUME HYDROPNEUMATIC ACCUMULATOR

The present invention relates to a hydropneumatic accumulator for variable volume, having two points of application following respectively two elements mounted so as to slide relative to each other and containing a fluid medium of variable volume consisting in part of liquid and in part of gas, separation means being placed between the liquid portion and the gaseous portion.

Such a device acts notably as a spring. When a sufficient stress is exerted on the two points of application from a position apart to bring them together, the variable volume of the fluid medium tends to decrease. The liquid portion compresses the gaseous portion, overcoming the resistance offered by the gas pressure. When the stress ceases or diminishes, this gas pressure tends to push the liquid portion back and to increase the variable volume of the fluid medium, thereby tending to bring the two points of application back to a position apart.

The known devices of this kind generally have a cumbersome, complex and expensive construction, involving a large number of structural parts and seal joints.

The present invention relates to a hydropneumatic accumulator of variable volume of the above stated type which does not have these disadvantages, whose construction is simple, sturdy and compact, with a small number of structural parts and seal joints.

According to the invention, a hydropneumatic accumulator of variable volume of the above stated kind is characterized in that it comprises a rigid envelope of variable volume defined by said elements, one of which consists of a tubular casing forming a cylinder, containing liquid and presenting one of the points of application, while the other element is an inserted container sliding as a whole, like a plunger, in said casing, said container having two closed ends, one of which is inside the casing and presents liquid flow means, and the other end of which presents the other point of application and a gas filling orifice, said separation means being situated between said liquid passage means and said gas filling orifice. These separation means consist, for example, of a deformable bladder mounted inside the container.

Owing to this arrangement, the mounting is particularly sturdy and the space requirement small, with few parts. A simple seal joint between the casing and the container is sufficient, and the latter may be of an extremely simple and convenient construction.

It is desirable that the liquid flow means of the container be such that the bladder, in a state of maximum expansion in the interior of this container, cannot pass through them. A satisfactory solution consists in providing these liquid flow means in the form of a plurality of sufficiently narrow orifices. By changing the number and/or the cross section of these orifices, one can modify the liquid outflow conditions, hence modify the speed of reaction of the hydropneumatic accumulator as a function of its application.

It will be seen also that it is not necessary, in the hydropneumatic accumulator according to the invention, to provide special means of stroke limitation under compression and under extension. In fact, the stroke is limited under compression by the mere abutting of the end of the container provided with liquid flow means against the bottom of the tubular casing, and the stroke limitation under extension is limited by the effect of liquid suction created by the liquid portion when the bladder is in a state of maximum expansion inside the bottle, thereby preventing the container from leaving the casing at the wrong time.

It will be noted that when the extension stroke is limited, for example, due to the installation in which the hydropneumatic accumulator is installed, the quantity of liquid contained in said accumulator can be varied, among other things, so as to modify its elasticity curve.

An embodiment of the invention is described below, by way of example, in reference to the annexed drawings, in which.

Figure 1:
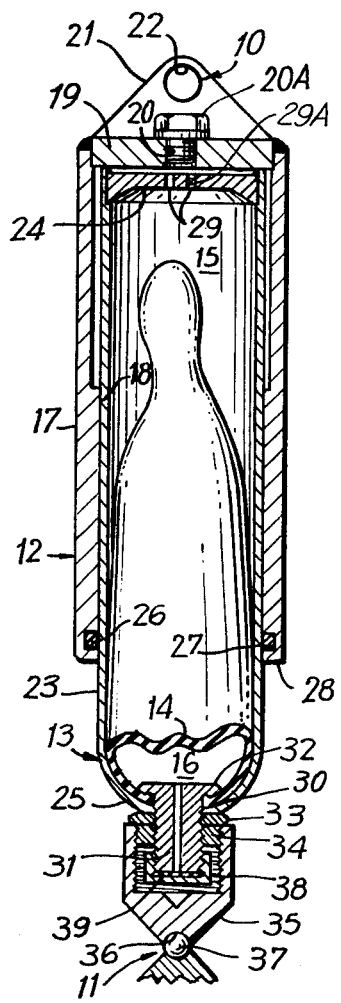
FIG. 1 is a view in longitudinal section of a hydropneumatic accumulator according to the invention, in a position of maximum compression.

In the embodiment shown (FIGS. 1 to 3), a hydropneumatic accumulator comprises two points of application 10 and 11 following, respectively, two elements 12 and 13 mounted in sliding relation to each other and defining a rigid envelope of variable volume 12-13. The latter contains a fluid medium of variable volume, which is divided by separation means 14 into a liquid portion 15 and a gaseous portion 16. In an alternative embodiment, at least one of the flow passages 29 may include a one-way valve 29A.

The first element 12 consists of a casing having a cylindrical wall 17 internally machined at 18 and a flat bottom 19 fixed by welding or screwing. The latter comprises a liquid feed means 20 consisting, for example, of an orifice permitting admission of liquid into the envelope 12-13 and leakage of liquid from this envelope. In the example shown, this feed means 20 is closable by a stopper 20A when the quantity of liquid in the envelope 12-13 is intended to remain constant.

The point of application 10 comprises, for example, a plate 21 which is integral with the casing 12 near the bottom 19 and which presents a bore 22 adapted to receive a shaft to constitute the point of application 10.

The second element 13 consists of a container whose lateral wall 23 is cylindrical and which comprises two closed ends 24 and 25.

The container 13 is inserted, sliding as a whole, like a plunger, in the casing 12 following the inner machined bore 18 of the latter. The seal between the container 13 and the casing 12 is assured by a seal joint 26 which is inserted in an annular groove 27 of the casing 12 in the vicinity of the end 28 thereof, which is open and opposite the bottom 19. The seal joint 26 cooperates with the lateral 23 of container 13.

The closed end 24 of the container 13 consists of a flat bottom integral with the lateral wall 23 and extending into the casing 12 near the bottom 19. The flat bottom 24 is fixed by welding as shown, or in an easily interchangeable manner, for example, by screwing, so as to permit modifying the characteristics of the hydropneumatic accumulator as set forth below. Botton 24 of the container 13 has liquid flow means which consist of a plurality of narrow orifices 29.

The other closed end 25 of container 13 is substantially hemispherecal and is disposed on the exterior of the casing 12. It has a gas filling orifice 30. This orifice 30 comprises a gas pressure valve 31.

The separation means 14 consist of a deformable bladder which extends into the container 13, being mounted at 32 to the valve 31. This bladder is placed between the liquid orifices 29 and the gas filling orifice 30.

Valve 31 is externally threaded and receives a lock nut 33 on the container as well as a counternut 34 with external threading on which is screwed a cap 35. The latter terminates in an recess 36 which cooperates with a ball 37 constituting the point of application 11 in the form of a swivel joint. The end of valve 31 is preferably closed by a screwed cover 38 with interposition of a seal joint 39.

To take the hydropneumatic accumulator according to the invention into service, gas, for example nitrogen, is introduced into the bladder 14 through the valve 31 at an appropriate pressure which permits charging this bladder in a state of maximum expansion inside the container 13 (FIG. 3) where the bladder 14 matches the contours of the inner wall of this container 13 all around and in particular comes in contact with the bottom 24 reacting against the orifices 29. These are provided narrow enough to prevent the bladder 14 from squeezing through these orifices 29. A predetermined quantity of liquid, for example oil, is introduced through the port 20 into the casing 12 and the stopper 20A then is inserted to close the port 20.

The hydropneumatic accumulator is now in operating condition.

Figure 2:
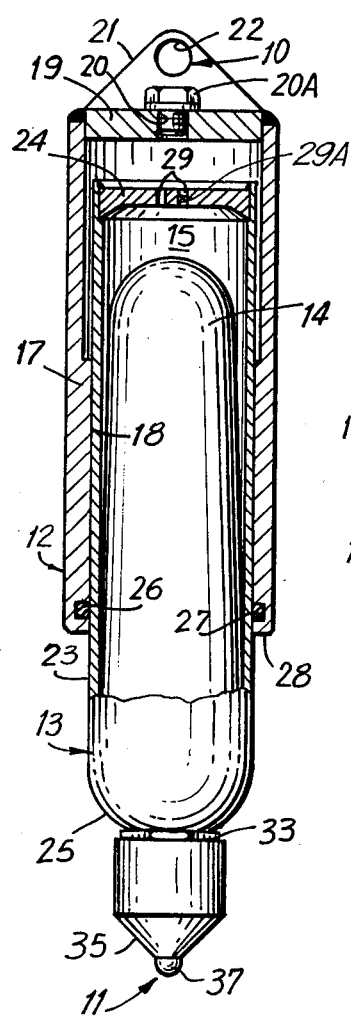
FIGS. 2 and 3 are views similar to FIG. 1 but corresponding, respectively, to an intermediate position and to a position of maximum extension.

When a sufficient stress is exerted on the points of application 10 and 11 from a position apart (FIG. 3) to bring them together, the variable volume of the fluid medium 15–16 tends to decrease and the liquid 15 compresses the bladder 14, overcoming the resistance offered by the pressure of the gas in bladder 14 (FIG. 2). When this stress ceases or diminishes, the pressure of the gas in the bladder 14 tends to push the liquid 15 back, which tends to return the points of application 10 and 11 to a position apart. It will be noted that the liquid orifices 29 are chosen narrow enough to avoid passage of the bladder 14. By increasing or decreasing the number of orifices 29, and/or by modifying their cross-section below a fixed limit for the non-passage of the bladder 14, the pressure drop of the liquid flow traversing these orifices can be reduced or increased, thereby modifying the reaction characteristics of the hydropneumatic accumulator as needed, for a given gas pressurization.

Also there may be provided balls or other equivalent means in combination with one or more orifices 29, to obtain different rates of flow depending on the direction of outflow through the bottom 24.

Figure 3:
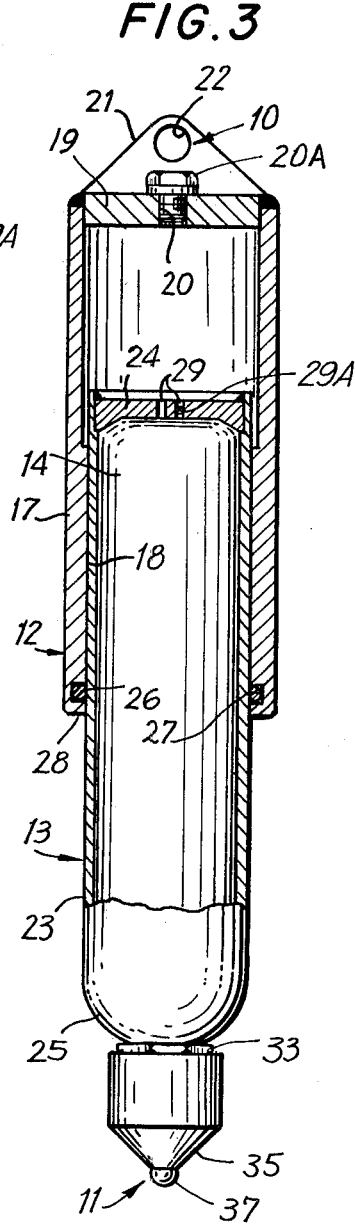

It will be noted that in the example shown the hydropneumatic accumulator according to the invention has its stroke limited in the direction of compression by abutment of the bottom 24 against the bottom 19 (FIG. 1), and in the extension, by the suction effect of the liquid 15 (FIG. 3).

It will be noted also that the hydropneumatic accumulator according to the invention, permits, by varying the quantity of liquid by the feed means 20, a double function to be fulfilled, namely, on the one hand, shifting an element from a first position to a second position and, on the other hand, damping the movements of said element from the second position toward the first position.

They hydropneumatic spring according to the invention can receive all appropriate applications. Among others, it can be applied to a pantograph 40 of an electric railcar 41 to permit maintaining contact of the plate 42 of this pantograph 40 with the overhead cable 43. At 44 is seen a hoisting jack of the pantograph 40 and at 45 a spring for a return to low position.

To obtain this permanent action, one of the arms 46 of the pantograph 40 is connected through a slide 47 to the hydropneumatic spring 12-13 according to the invention. The force produced by this hydropneumatic spring 12-13 is transmitted to the plate 42 of the pantograph.

The height variations between the rolling plane of the railbed and the overhead cable 43 are compensated by such a flexible and independent device. Permanent frictional contact at 42-43 is thus assured when the electric railcar runs at great speed.

Figure 4:
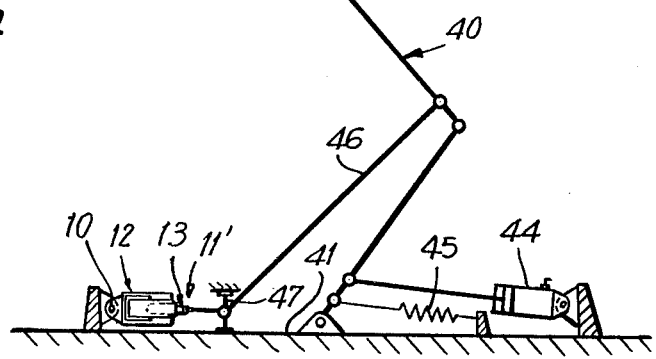
FIG. 4 illustrates an application of the invention to the control of a pantograph of an electric railcar.

In the case of FIG. 4, the swivel joint 11 is replaced by a rigid connection 11'.

It should be noted that the hydropneumatic accumulator acts on the arm 46, preferably through an elongated eyelet (not shown), to avoid that the lowering of the pantograph 40 create tensil stresses on the hydropneumatic accumulator.

Having thus described the invention and illustrated its use, what is claimed as new and is desired to be secured by Letters Patent is:

1. A variable volume hydropneumatic accumulator comprising a tubular casing having a cylindrical bore open at one end thereof and having a flat closed end, a first point of force application at said closed end, a cylindrical hollow container member axially slidably mounted in said bore in contact with said casing, seal means defined between said casing and container member, said container member including a first flat closed end disposed internally of said bore, and a second closed end extending outwardly of said bore, a second point of force application formed on said second end of said container member, the stroke of said accumulator being the moving together and apart of said first and second points of force application, a gas charging orifice formed in said second end of said container member, restricted liquid flow passage means formed in the wall of said first flat end of said container member, and a deformable bladder separator means disposed in said container member between said ends and providing a liquid chamber and a gas chamber therein in communication respectively with said liquid flow passage means and said gas charging orifice, said separator means is capable of maximum expansion within said container member to substantially fill the diameter of said bore and the length of said container member, whereby all of said liquid flow passage means restrictedly control a volume of liquid substantially equal to the volume of liquid in said liquid chamber in said container member, and wherein the stroke is limited under compression by the abutting of said closed end of said casing against said first flat end of said container member and the stroke is limited under extension by the effect of liquid suction created by said volume of liquid when said bladder is in said state of maximum expansion within said container member, whereby said container member is prevented from leaving said casing upon extension.

2. An accumulator in accordance with claim 1 wherein said gas filling orifice comprises a gas pressure valve for variably charging said bladder.

3. Apparatus in accordance with claim 1 and including liquid feed means formed in said closed end of said casing.

4. Apparatus in accordance with claim 3 and including stopper means for closing said liquid feed means, whereby said volume of liquid disposed in said casing is predetermined and does not change during said stroke.

5. Apparatus in accordance with claim 1 and including interchangeable means in said first end of said container member for varying the flow capacity of said passage means and, hence, the operating characteristics of said accumulator.

6. Apparatus in accordance with claim 5 wherein at lease one said flow passage includes one way valve means therein.

* * * * *